(12) United States Patent
Chua-Eoan et al.

(10) Patent No.: US 8,063,664 B2
(45) Date of Patent: Nov. 22, 2011

(54) DISTRIBUTED SUPPLY CURRENT SWITCH CIRCUITS FOR ENABLING INDIVIDUAL POWER DOMAINS

(75) Inventors: Lew G Chua-Eoan, Carlsbad, CA (US); Matthew L Severson, Oceanside, CA (US); Sorin A Dobre, San Diego, CA (US); Tsvetomir P Petrov, San Diego, CA (US); Rajat Goel, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 12/642,651

(22) Filed: Dec. 18, 2009

(65) Prior Publication Data
US 2010/0097101 A1  Apr. 22, 2010

Related U.S. Application Data

(63) Continuation of application No. 11/228,912, filed on Sep. 16, 2005, now Pat. No. 7,659,746.

(60) Provisional application No. 60/652,925, filed on Feb. 14, 2005.

(51) Int. Cl.
*H03K 19/0175* (2006.01)
*H03K 19/094* (2006.01)

(52) U.S. Cl. ............... 326/83; 326/62; 326/80; 326/81; 326/82; 326/84; 326/85

(58) Field of Classification Search .................. 326/83
See application file for complete search history.

(56) References Cited

U.S. PATENT DOCUMENTS

| | | | | | |
|---|---|---|---|---|---|
| 5,461,338 | A | * | 10/1995 | Hirayama et al. | 327/534 |
| 5,646,543 | A | * | 7/1997 | Rainal | 326/26 |
| 5,751,651 | A | * | 5/1998 | Ooishi | 365/226 |

(Continued)

FOREIGN PATENT DOCUMENTS

EP    0955573    11/1999

(Continued)

OTHER PUBLICATIONS

Written Opinion, PCT/US2006/004891—International Search Authority—European Patent Office, Dec. 27, 2006.

(Continued)

*Primary Examiner* — Shawki S Ismail
*Assistant Examiner* — Matthew C Tabler
(74) *Attorney, Agent, or Firm* — Nicholas J. Pauley; Peter M. Kamarchik; Jonathan T. Velasco

(57) ABSTRACT

An integrated circuit includes multiple power domains. Supply current switch circuits (SCSCs) are distributed across each power domain. When a signal is present on a control node within a SCSC, the SCSC couples a local supply bus of the power domain to a global supply bus. An enable signal path extends through the SCSCs so that an enable signal can be propagated down a chain of SCSCs from control node to control node, thereby turning the SCSCs on one by one. When the domain is to be powered up, a control circuit asserts an enable signal that propagates down a first chain of SCSCs. After a programmable amount of time, the control circuit asserts a second enable signal that propagates down a second chain. By spreading the turning on of SCSCs over time, large currents that would otherwise be associated with coupling the local and global buses together are avoided.

4 Claims, 14 Drawing Sheets

U.S. PATENT DOCUMENTS

| | | | |
|---|---|---|---|
| 5,781,062 A * | 7/1998 | Mashiko et al. | 327/544 |
| 5,801,576 A * | 9/1998 | Ooishi | 327/530 |
| 5,929,687 A * | 7/1999 | Yamauchi | 327/333 |
| 5,973,507 A * | 10/1999 | Yamazaki | 326/52 |
| 6,064,223 A * | 5/2000 | Lu et al. | 326/21 |
| 6,184,729 B1 * | 2/2001 | Pasqualini | 327/112 |
| 6,222,388 B1 * | 4/2001 | Bridgewater, Jr. | 326/86 |
| 6,225,852 B1 * | 5/2001 | Cleveland et al. | 327/534 |
| 6,329,874 B1 * | 12/2001 | Ye et al. | 327/544 |
| 6,744,301 B1 * | 6/2004 | Tschanz et al. | 327/534 |
| 6,750,680 B2 * | 6/2004 | Zama et al. | 326/98 |
| 7,102,254 B2 * | 9/2006 | Veendrick et al. | 307/126 |
| 7,176,745 B2 * | 2/2007 | Itoh et al. | 327/534 |
| 7,276,932 B2 * | 10/2007 | Kuang et al. | 326/33 |
| 7,355,455 B2 * | 4/2008 | Hidaka | 326/121 |
| 2003/0074594 A1 * | 4/2003 | Hirakawa et al. | 713/500 |
| 2004/0080340 A1 * | 4/2004 | Hidaka | 326/83 |
| 2004/0227542 A1 * | 11/2004 | Bhavnagarwala et al. | 326/83 |
| 2004/0263237 A1 * | 12/2004 | Kim et al. | 327/530 |
| 2006/0022712 A1 * | 2/2006 | Berthold et al. | 326/83 |

FOREIGN PATENT DOCUMENTS

| | | |
|---|---|---|
| JP | 9231756 A | 9/1997 |
| JP | 2003289245 A | 10/2003 |
| JP | 2004221243 A | 8/2004 |

OTHER PUBLICATIONS

International Search Report, PCT/US2006/004891—International Search Authority—European Patent Office, Dec. 27, 2006.

Royannez et al., "90nm Low Leakage SoC Design Techniques for Wireless Applications", Texas Instruments, Villeneuve Loubet, France, 2005 IEEE International Solid-State Circuits Conference.

Suhwan, Kim et al., "Minimizing inductive noise in system-on-a-chip with multiple power gating structures", European Solid-State Circuits, 2003. ESSCIRC 2003. Piscataway, NJ, USA, IEEE, Sep. 16, 2003, pp. 0 635-638, XP010677246, ISBN: 0/7803-7995-0.

Kozhaya, J. N. et al.: "An Electrically Robust Method for Placing Power Gating Switches in Voltage Islands," Custom Integrated Circuits Conference, 2004.Proceedings of the IEEE 2004 Orlando, FL, USA, Oct. 3-6, 2004, Piscataway, D NJ, USA, IEEE, Oct. 2, 2004.

* cited by examiner

SUPPLY CURRENT SWITCH CIRCUIT

DAISY CHAIN TURN ON

MORE THAN TWO SETS OF SUPPLY
CURRENT SWITCH CIRCUITS

SETS OF SCSC SWITCHES OF DIFFERENT SIZES

HEADSWITCH SCSC WITH SENSE

FOOTSWITCH SCSC WITH SENSE

DOMAIN USING HEADSWITCH SCSC WITH SENSE

DOMAIN USING FOOTSWITCH SCSC WITH SENSE

DISTRIBUTED SUPPLY CURRENT SWITCH CIRCUITS FOR ENABLING INDIVIDUAL POWER DOMAINS

CLAIM OF PRIORITY UNDER 35 U.S.C. §120

The present application for patent is a Continuation and claims priority to patent application Ser. No. 11/228,912 entitled "DISTRIBUTED SUPPLY CURRENT SWITCH CIRCUITS FOR ENABLING INDIVIDUAL POWER DOMAINS" filed Sep. 16, 2005 now U.S. Pat. No. 7,659,746, now allowed, and assigned to the assignee hereof and hereby expressly incorporated by reference herein.

The present application for patent claims priority to Provisional Application No. 60/652,925 entitled "Distributed Method for enabling individual Power domains during active operation" filed Feb. 14, 2005, and assigned to the assignee hereof and hereby expressly incorporated by reference herein.

BACKGROUND

1. Field

The disclosed embodiments relate generally to the powering up and/or the powering down of a power domain within an integrated circuit.

2. Background

FIG. 1 (Prior Art) is a simplified top down diagram of an example of an integrated circuit die 1. Integrated circuit die 1 includes a peripheral ring of bonding terminals 2, and four domains of internal circuitry 3-6. These domains are called power domains because the circuitry within each domain can be powered or unpowered separately from the other domains.

FIG. 2 (Prior Art) is a simplified schematic diagram of the four power domains 3-6 of FIG. 1. The domains are powered via a supply voltage terminal 7 (denoted PWR), and a ground terminal 8 (denoted GND). The supply voltage is supplied to the various domains 3-6 by a supply bus 9. The supply bus is sometimes called a power bus. Supply bus 9 typically is in the form of a grid of conductors. The linear shape illustrated in FIG. 2 is presented just as an example to simplify the explanation of an operation of the power domains.

Although a supply bus such as supply bus 9 is typically fashioned as a wide strip of metal so that it will have good electrical conductor properties, the supply voltage bus nonetheless does have a small series resistance, a capacitance and a small inductance. The resistance and inductance are represented in the diagram with resistor and inductor symbols.

The various domains of circuitry 3-6 are grounded by a ground bus 10. Although the ground bus is also typically made of a wide strip of metal, it too has a small series resistance, a capacitance and a small inductance. The resistance and inductance are represented in the diagram with resistor and inductor symbols.

To reduce power consumption of integrated circuit 1, it is desired to be able to cut power to a domain if the circuitry within the domain is not in use. Switches 11-14 are provided so that the current path from power bus 9 to ground bus 10 through a selected domain can be cut if desired. If, for example, switch 13 is open, then there is no current flow from power bus 9 to ground bus 10 through domain 5. It is also desired to be able to supply power to a domain of circuitry that is to be used. If, for example, switch 13 is closed, then a supply current can flow from power bus 9 to ground bus 10 through domain 5.

FIG. 3 (Prior Art) illustrates a problem that can occur when a dormant power domain is then powered up so that circuitry within the domain can be used. Initially, circuitry within domains 3, 4 and 6 are in use. Switches 11, 12 and 14 are therefore closed. Switch 13, however, is open because the circuitry of domain 5 is not in use. Each domain has local power and ground conductors that extend to the various circuit elements within the domain. The local power and ground conductors and the circuitry within the domain constitute a capacitance between the power and ground buses 9 and 10. The capacitor symbols 15-18 in the domains represent these capacitances. Because switch 13 is open, capacitor 17 is discharged.

Next, the circuitry within domain 5 is to be used. The circuitry within domain 5 therefore needs to be powered. Switch 13 is closed so that the local power and ground bus lines within the domain can be charged and so that power and ground potential can be supplied to the circuitry within the domain. Initially, however, there is no charge on capacitor 17. A large inrush of current 19 therefore flows into the domain to charge the capacitance 17. This current 19 flows through supply bus 9, into domain 5, and out of domain 5 through ground bus 10. Due to the series resistance and inductance of the supply bus, the large current surge on supply bus 9 causes the voltage on node N2 to spike down. Similarly, the large current surge on ground bus 10 causes the voltage on node N6 to spike up. These spikes reduce the magnitude of the voltage between nodes N2 and N6. Rather than the proper supply voltage being present between nodes N2 and N6, the supply voltage seen by the circuitry within domain 4 drops quickly. This may disrupt operation of circuitry in the neighboring power domain 4. A solution is desired.

SUMMARY

An integrated circuit includes multiple power domains. The power domains can be powered up and powered down independently of one another under control of a central power management control circuit. Each power domain includes a distributed set of supply current switch circuits (SCSCs). The SCSCs are distributed across the area of the power domain in a substantially uniform fashion. When a first digital logic value is present on a control node within a SCSC, a switch within the SCSC couples a local supply bus of the power domain to a global supply bus. When a second digital logic value is present on the control node, then the switch is not conductive and the SCSC does not couple the local supply bus to the global supply bus. Each SCSC has an input node and an output node. The SCSCs of a power domain are chained together to form a first chain and a second chain.

When the power domain is to be powered up, the central power management control circuit asserts an enable signal that is supplied to the input node of the first SCSC of the first chain. The enable signal propagates down the first chain of SCSCs from control node to control node, thereby turning the SCSCs of the first chain on, one by one, in a daisy chain fashion. After a programmable amount of time, the control circuit asserts a second enable signal that is supplied to the input node of the first SCSC in the second chain. The second enable signal propagates down the second chain of SCSCs from control node to control node, thereby turning the SCSCs of the second chain on, one by one. By spreading the turning on of the SCSCs of the power domain over time, large currents that would otherwise be associated with coupling the local and global buses are avoided.

In one embodiment, the power management control circuit includes a bus interface, an enable register, a count register, and a down counter. An initial count value is written into the count register in a bus write cycle. An enable bit in the enable register is then set by writing a digital high value into the bit of the enable register in a bus write cycle. The result of the setting of the enable bit is assertion of the first enable signal. The down counter is also started counting down from the initial count value. When the down counter reaches a zero count, then the second enable signal is asserted. The period of time between assertion of the first enable signal and assertion of the second enable signal is therefore determined by the count value written into the count register. The period of time is software programmable due to the fact that the count register can be written in a bus write cycle. In one embodiment, a processor coupled to the bus controls the control circuit by writing values into the enable and count registers across the bus.

Numerous different types of SCSC circuits are usable in combination with a power management control circuit. In one novel SCSC circuit, the SCSC has a SENSE input lead. The control circuit includes a voltage sensing element that detects when the voltage on the local supply bus reaches a predetermined switching voltage. The SCSC only couples the local supply bus to the global supply bus if either: 1) an enable signal is present on a control node within the SCSC, or 2) if both an asserted SENSE signal is received on the SENSE input of the SCSC and a local voltage on the local supply bus is a voltage that is defined to be a predetermined digital logic value.

In one use of the novel SCSC having a SENSE input lead, the SCSCs in the first chain have their SENSE inputs disabled. These SCSCs are made to couple the local supply bus to the global supply bus when an enable signal propagates through them. The SCSCs in the second chain, however, have their SENSE enable input leads coupled to the output of the voltage sensing element in the control circuit. When the power domain is to be powered, the voltage difference between the local supply bus and the global supply bus is fairly large. The control circuit asserts a first enable signal that is supplied to the first chain of SCSCs. The SCSCs of the first chain turn on and weakly couple the local supply bus to the global supply bus. Due to the weak coupling, a significant amount of time passes before the voltage on the local supply bus approaches the predetermined switching voltage. The voltage sensing element in the control circuit therefore initially does not detect the predetermined switching voltage on the local supply bus. The SENSE signal is therefore not supplied to the SCSCs of the second chain. As the voltage difference between the local supply bus and the global supply bus decreases, the voltage sensing element detects that the voltage on the local supply bus has reached the predetermined switching voltage. The SENSE signal is then supplied to the SENSE input leads of the SCSCs of the second chain. Each SCSC of the second chain locally senses the voltage on the local supply bus. If the locally sensed voltage is a voltage in the voltage range that is defined to be the predetermined digital logic value, then the particular SCSC couples the local supply bus to the global supply bus. Each SCSC of the second chain therefore determines for itself whether to couple the local supply bus to the global supply bus based on a locally sensed voltage of the local supply bus. When all the SCSCs of the second chain are turned on, the local supply bus is strongly coupled to the global supply bus and the process of powering up the power domain is complete.

Different power domains of an integrated circuit can employ different types of SCSCs. One power domain may, for example, include SCSCs involving P-channel pullup transistors that couple a local power bus to a global power bus. Another power domain may, for example, include SCSCs involving N-channel pulldown transistors that couple a local ground bus to a global ground bus. SCSCs in one power domain may include the SENSE input, whereas the SCSCs in another power domain may not. The SCSCs of each power domain can be turned on in a different fashion by the central power management control circuit. A power domain may utilize a mix of several different types of SCSCs.

Additional embodiments are described in the detailed description below. This summary does not purport to define the invention. The invention is defined by the claims.

DETAILED DESCRIPTION

Figure 1:
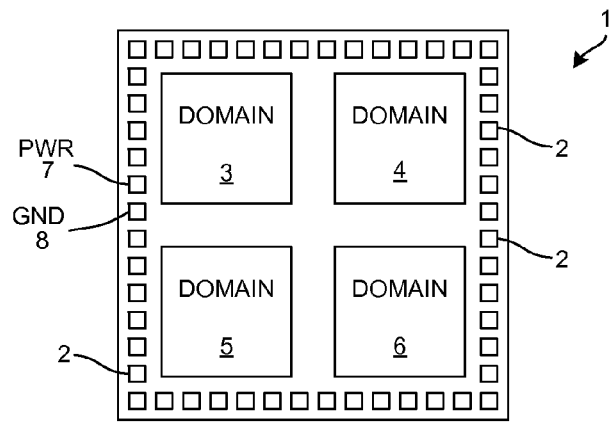
FIG. 1 (Prior Art) is a simplified top down diagram of an example of an integrated circuit die 1 having four power domains.
Figure 2:
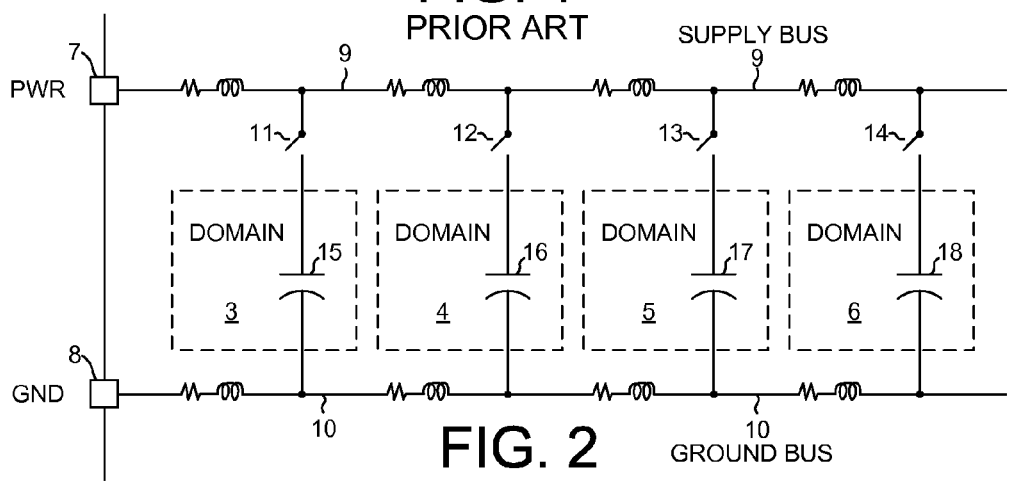
FIG. 2 (Prior Art) is a simplified schematic diagram of the four power domains of FIG. 1.
Figure 3:
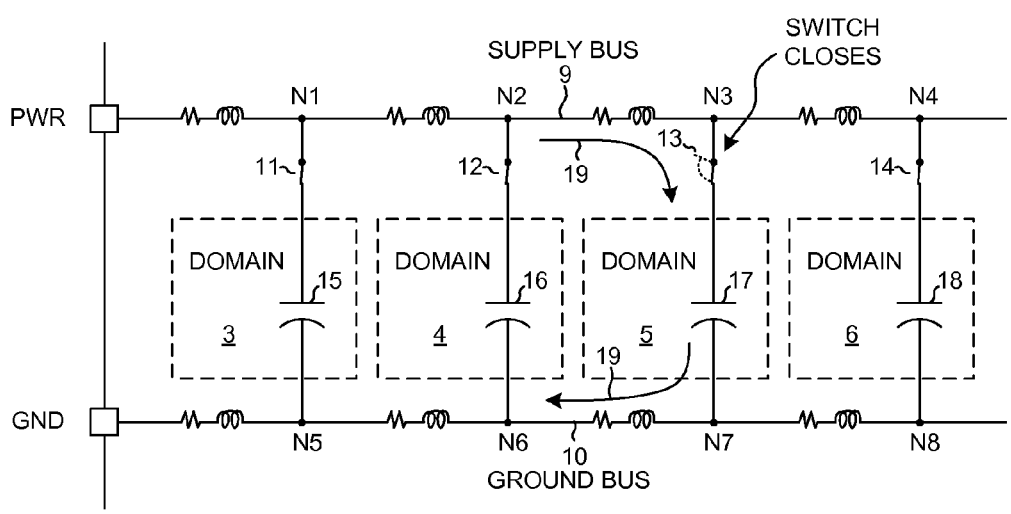
FIG. 3 (Prior Art) is a simplified schematic diagram showing how the powering up of one of the power domains of the integrated circuit of FIG. 1 can disrupt operation of circuitry in a neighboring power domain.
Figure 4:
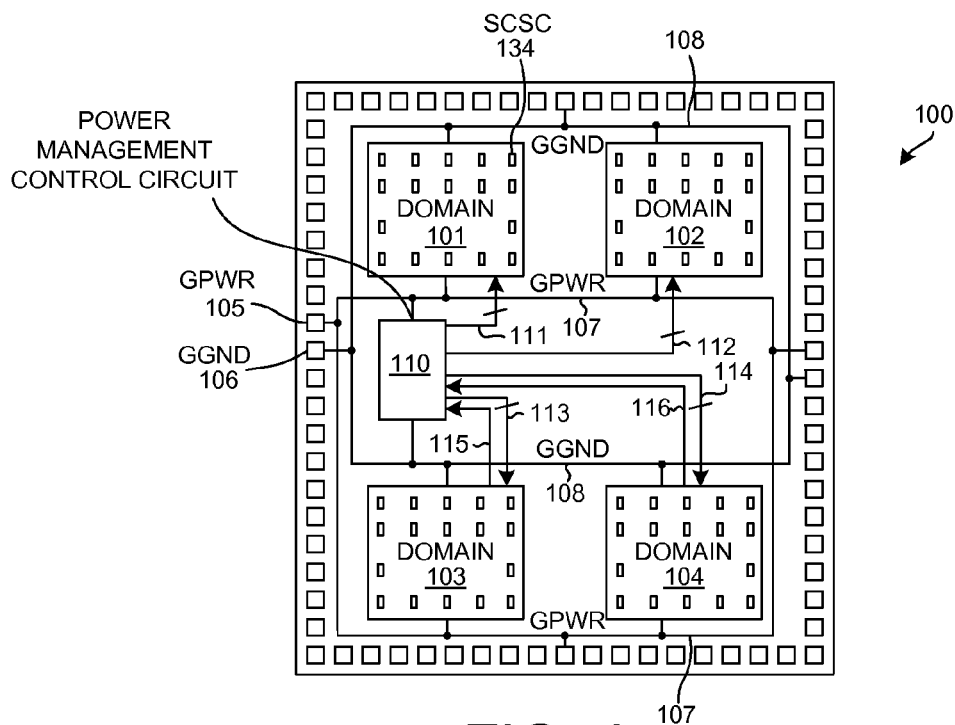
FIG. 4 is a simplified top down diagram of an integrated circuit die having a central power management control circuit and four power domains in accordance with one novel aspect.

FIG. 4 is a simplified top down diagram of an integrated circuit die 100 in accordance with one novel aspect. Integrated circuit die 100 includes four power domains of circuitry 101-104. A global supply voltage GPWR is present on a supply voltage terminal 105 of the integrated circuit die. A global ground potential GGND is present on a ground terminal 106 of the integrated circuit die. A global supply bus 107 extends around the integrated circuit die so that each of the power domains is coupled to receive the global supply voltage GPWR from supply voltage terminal 105. Similarly, a global ground bus 108 extends around the integrated circuit die so that each of the power domains is coupled to receive the global ground potential GGND from ground terminal 106.

The network of conductors including global supply bus 107 that couples the global supply voltage GPWR to the various power domains is referred to as the global power grid. The network of conductors including global ground bus 108 that couples global ground potential GGND to the various power domains is referred to as the global ground grid. Each of these grids is typically fashioned to have much more of a comb-shaped grid structure than illustrated in FIG. 4. The shapes of the global power and ground buses 107 and 108 of FIG. 4 are presented in simplified form to simplify the illustration and explanation of novel aspects of the embodiments.

Each of power domains 101-104 includes a plurality of supply current switch circuits (SCSCs). Reference numeral 134 identifies one such SCSC. A power management control circuit 110 is connected to and controls the SCSCs within each of the power domains 101-104 by conductors 111-114, respectively. Control circuit 110 also receives input signals from the SCSCs in domains 103 and 104 via conductors 115-116, respectively. Control circuit 110 is directly coupled to global supply bus 107 and to global ground bus 108. The circuitry of control circuit 110 receives supply current directly from the global supply bus and is directly grounded to the global ground bus without any intervening SCSCs. Control circuit 110 can be implemented in many different ways. Control circuit 110 may, for example, be implemented as a hard macro, a block of custom circuitry, or a group of standard cells.

Figure 5:
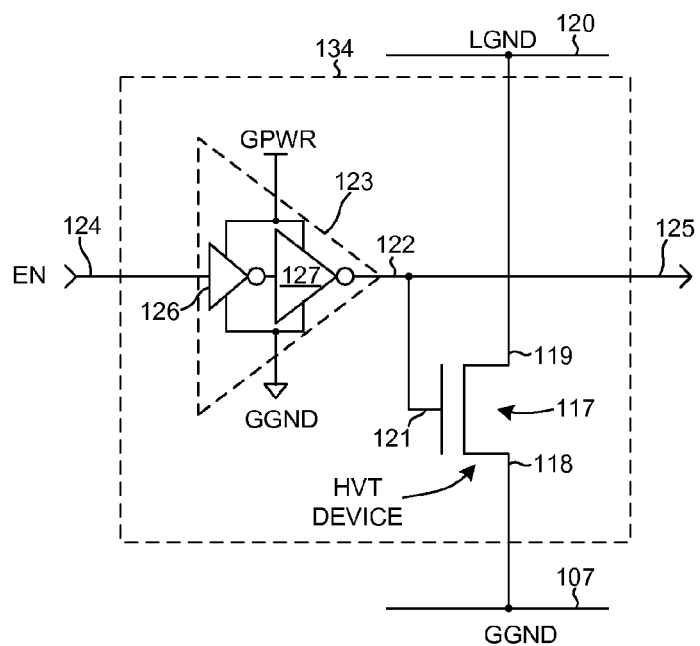
FIG. 5 is a schematic diagram of a supply current switch current (SCSC) used in the first power domain of the integrated circuit of FIG. 4.

FIG. 5 is a simplified circuit diagram of SCSC 134 within first power domain 101. SCSC 134 includes a large n-channel pulldown field effect transistor (FET) 117. Pulldown FET 117 is a high threshold transistor whose gate insulator has a thickness that is greater than the gate insulator thicknesses of other small transistors within the power domain that are used for signal processing and logic functions. The source terminal 118 of pulldown FET 117 is coupled to the global ground bus 107 (GGND), the drain terminal 119 of pulldown FET 117 is coupled to a local ground bus (LGND) 120, and the gate terminal 121 of pulldown FET 117 is coupled to an output terminal 122 of a noninverting buffer 123. SCSC 134 receives an enable signal on its enable input lead 124. After a propagation delay due to noninverting buffer 123, the enable signal is output onto enable output lead 125. If the voltage on the output lead 122 of buffer 123 is a digital logic high, then the source-drain path through pulldown FET 117 is made conductive and the local ground bus LGND 120 is coupled to the global ground bus GGND 107. If the voltage on output lead 122 of buffer 123 is a digital low, then the source-drain path through pulldown FET 117 is made nonconductive and any significant current path between the global ground bus GGND 107 and the local ground bus LGND 120 is interrupted. The buffer 123 is directly connected to and powered by the global power and ground buses GPWR and GGND so that it is operational if the remainder of the circuitry of first power domain 101 is unpowered. Buffer 123 in this example is made up of two inverters 126 and 127.

Figure 6:
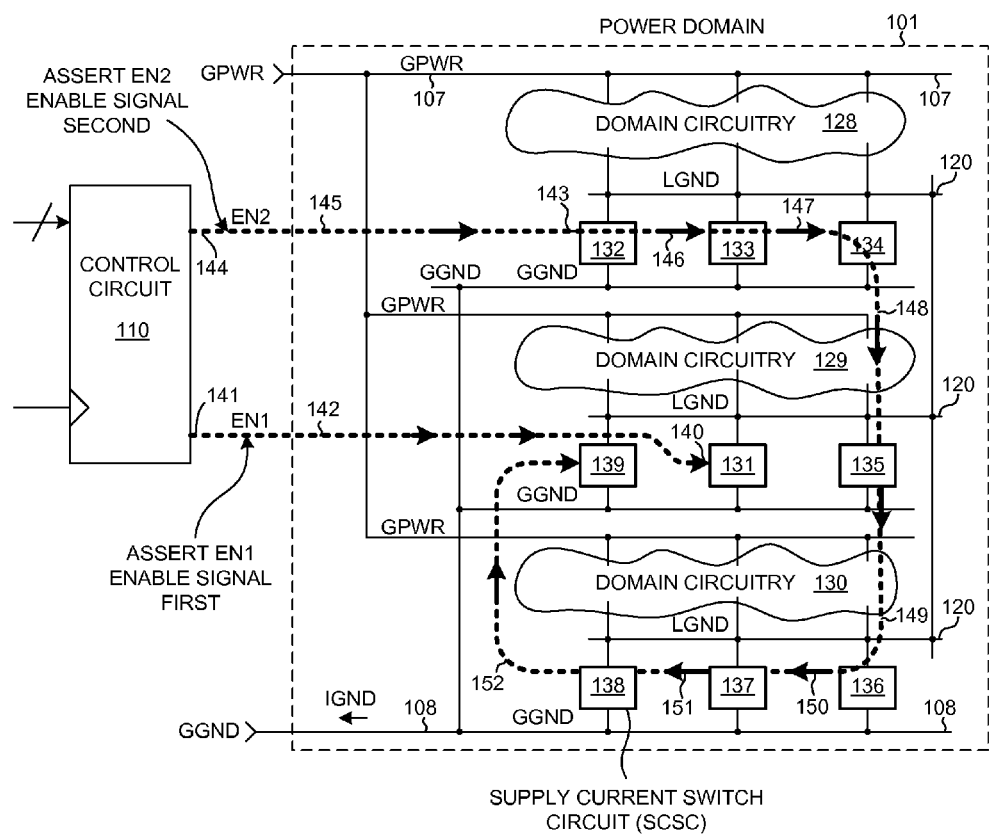
FIG. 6 is a more detailed diagram of the power management control circuit and first power domain of the integrated circuit of FIG. 4.

FIG. 6 is a more detailed diagram of power management control circuit 110 and first power domain 101. The domain circuitry within power domain 101 that is to be powered off when it is not in use, and that is to be powered when it is in use, is represented by cloud symbols 128-130. The power supply leads of this domain circuitry are permanently coupled to global voltage supply bus 107. The global supply voltage GPWR is therefore always present on the power supply leads of the domain circuitry when the supply voltage GPWR is present on power terminal 105 (see FIG. 4) of integrated circuit die 100.

The ground leads of the domain circuitry are not, however, always grounded to ground terminal 106 of integrated circuit die 100. Rather, the ground leads of the domain circuitry are coupled to local ground bus 120. Local ground bus 120 is local to power domain 101 and does not extend outside power domain 101. The term "global" does not mean that the global supply bus necessarily extends across the entire surface area of the integrated circuit die, but rather the term "global" is a relative term with respect to the term "local."

Each of the supply current switch circuits (SCSCs) 131-139 is coupled to local ground bus 120 and global ground bus 108 so that the source of the large N-channel pulldown transistor of the SCSC is connected to the global ground bus 108 and so that the drain of the large N-channel pulldown transistor is connected to the local ground bus 120. The SCSCs 131-139 are distributed across the integrated circuit area of power domain 101 in a substantially uniform two-dimensional array as illustrated.

The SCSCs are grouped into two sets. In the simplified illustration, there is only one SCSC in the first set. That SCSC is SCSC 131. SCSC 131 is disposed in a fairly central location in power domain 101. The enable input lead 140 of SCSC 131 is coupled to a first enable signal output lead 141 of control circuit 110 by a first enable signal conductor 142.

The second set of SCSCs in the illustrated example includes SCSCs 132-139. In the present embodiment, approximately three percent of the SCSCs are in the first set and approximately ninety-seven percent of the SCSCs are in the second set. The enable output lead of one SCSC in the second set is coupled to the enable input lead of the next SCSC in the second set so that the SCSCs of the second set are all serially coupled together in a chain. The enable input lead 143 of the first SCSC 132 in the chain is coupled to a second enable signal output lead 144 of control circuit 110 by a second enable signal conductor 145. The other enable signal conductors of the chain are designated with reference numerals 146-152.

Figure 7:
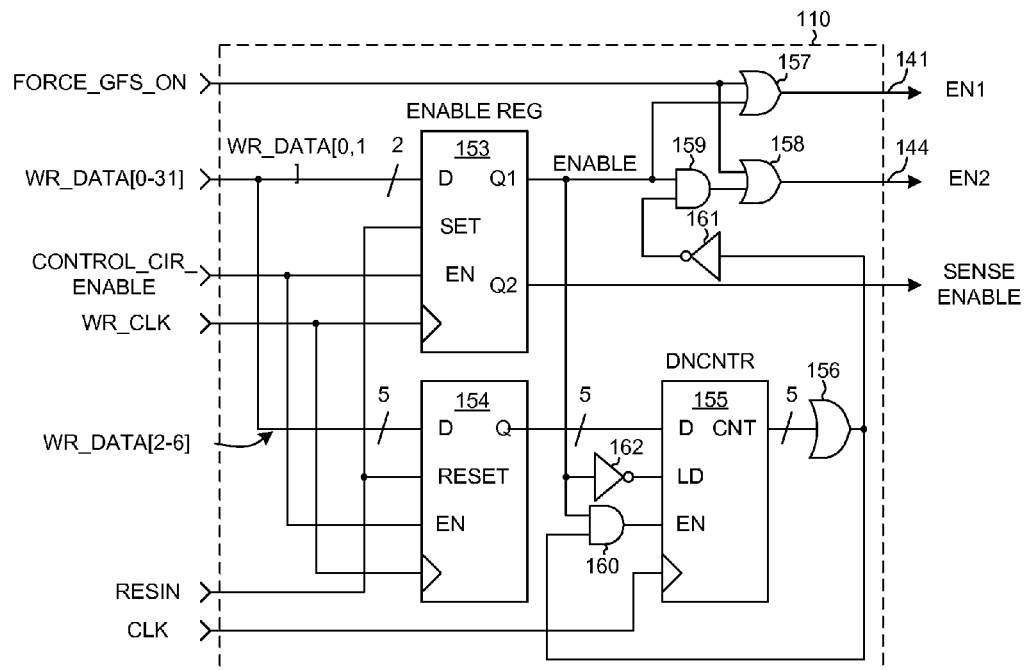
FIG. 7 is a schematic diagram of circuitry within the power management control circuit that controls the first power domain.

FIG. 7 is a schematic diagram of circuitry within power management control circuit 110 that controls the SCSCs 131-139 of the first power domain 101. There is other circuitry within power management control circuit 110 that controls the SCSCs in the other power domains 102-104. The circuitry of FIG. 7 that controls the SCSCs of power domain 101 includes a two-bit enable register 153, a five-bit count register 154, a five-bit count down counter 155, a five-bit OR gate 156, two two-input OR gates 157 and 158, two two-input AND gates 159 and 160, and two inverters 161 and 162. Each of these logic elements is powered directly from global supply bus 107 and global ground bus 108.

Figure 8:
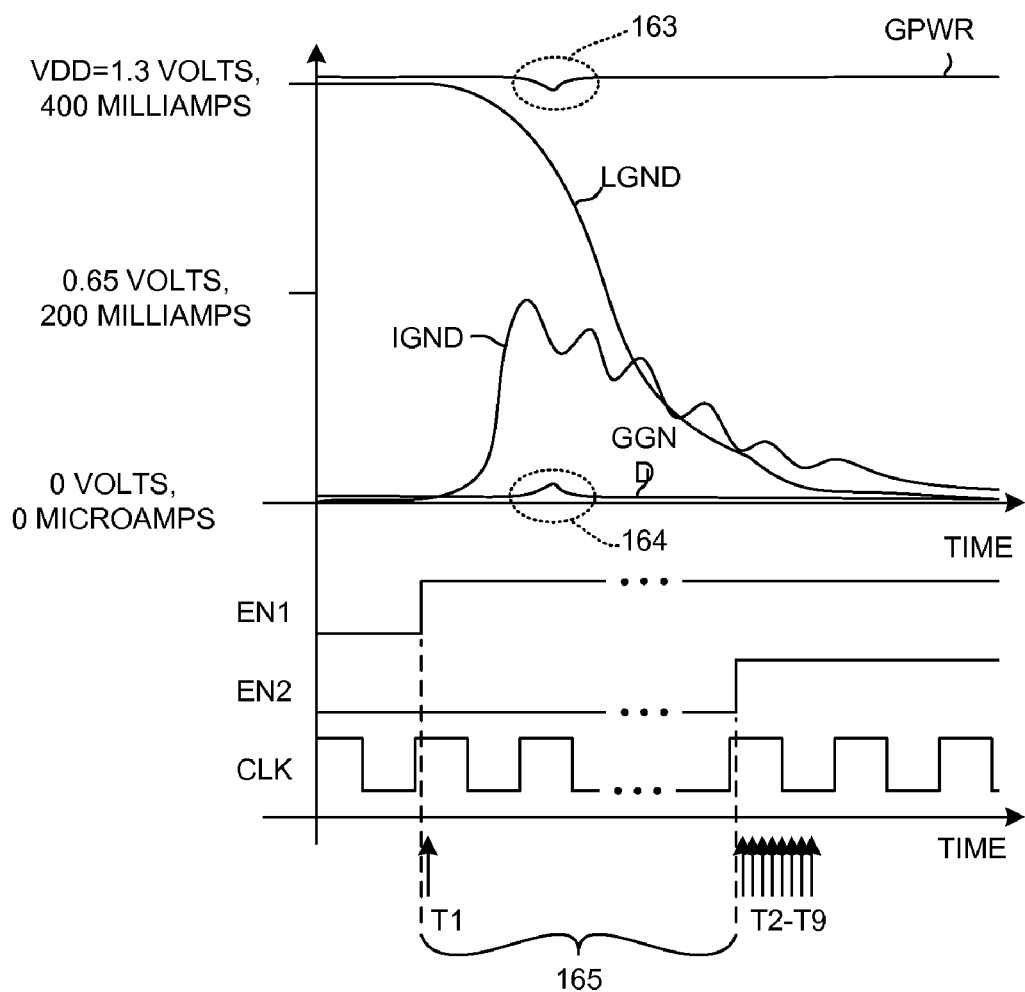
FIG. 8 is a waveform diagram that illustrates an operation of the circuitry of FIGS. 4-7.
Figure 8A:
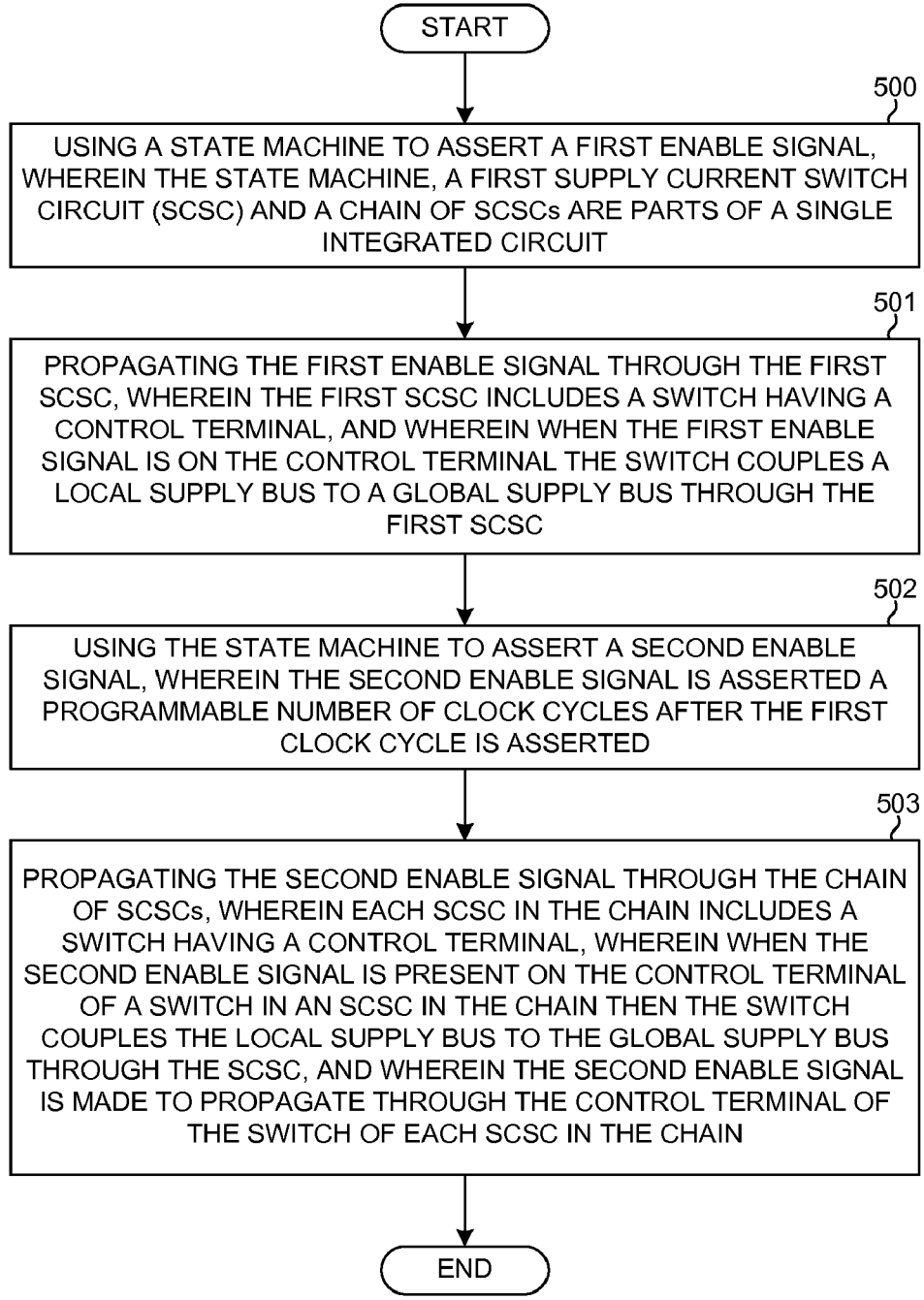
FIG. 8A is a flowchart that illustrates method steps in the operation illustrated in the waveform diagram of FIG. 8

FIG. 8 is a waveform diagram that illustrates an operation of the circuitry of FIGS. 4-7. FIG. 8A is a simplified flowchart that illustrates method steps in the operation.

Referring to FIG. 8, rather than controlling the SCSCs 131-139 so that all pulldown FETs of SCSCs 131-139 switch from being non-conductive to conductive at the same time, the SCSC 131 of the first set is enabled starting at a first time T1 and then after a programmable amount of time the SCSCs 132-139 of the second set are enabled starting at a second time T2. Rather than the SCSCs of the second set all being enabled precisely at the same time, successive ones of the SCSCs 132-139 of the chain are enabled, sequentially, one at a time. By staggering the times at which the various SCSCs 131-139 are enabled, the peak current sunk to the global ground bus 108 is reduced, thereby reducing the drops in supply voltage in neighboring power domains that would otherwise be caused by larger surges of current through the supply and/or ground buses.

Initially, the enable bit of enable register 153 stores a digital zero, the count register 154 stores a five-bit zero value, and the control signal FORCE_GFS_ON is low. This initial condition can be established either by supplying a reset signal on the input lead RESIN or by performing a bus write cycle where the values on bus lines WR_DATA[0, 2-6] are digital zeros. An instruction-executing processor (not shown) located elsewhere on integrated circuit die 100 may, for example, be coupled to the bus so that the processor can write the required values into the registers 153 and 154. The value of WR_DATA [0] is the value loaded into the enable bit of enable register 153 in a bus write cycle. The value of WR_DATA[1] is the value loaded into a SENSE enable bit of enable register 143. The value of WR_DATA[2-6] is the value loaded into the count register 154. During a bus write cycle, the registers 153 and 154 are enabled by asserting the enable signal CONTROL_CIR_ENABLE and then clocking the WR_DATA bus values into corresponding bits of registers 153 and 154 on the rising edge of a bus clock signal WR_CLK. A decoding AND gate (not illustrated) asserts the enable signal CONTROL_CIR_ENABLE high when two bus signals WR_ADDR_DEC and WR_EN (not illustrated) are both high.

Regardless of how the initial values in registers 153 and 154 are established, the zero value of FORCE_GFS_ON and the zero value in the enable bit of enable register 153 force the first enable signal EN1 to be a digital logic low and force the second enable signal EN2 to be a digital logic low. Because both the first and second enable signals EN1 and EN2 are low, the enable signals on the enable input leads (see enable input lead 124 of SCSC 134 in FIG. 5) of all the SCSCs 131-139 are low. All the pulldown transistors of the SCSCs 131-139 are therefore non-conductive. These transistors are considered to be off, and no significant current flows from local ground bus 120 to the global ground bus 108. Because the local ground bus 120 is the only ground bus for the domain circuitry 128-130, no significant supply current can flow through the domain circuitry 128-130. The domain circuitry 128-130 is unpowered.

Next, a non-zero five-bit count value is written into count register 154. This count value determines a number of cycles of a clock signal CLK that will occur between a later assertion of the first enable signal EN1 and the second enable signal EN2. The larger the count value, the more delay there will be between the first time (when EN1 is asserted high) and the second time (when EN2 is asserted high). In the present embodiment, the non-zero count value is written into count register 154 by the processor described above in an ordinary, 32-bit, bus write cycle. In the bus write cycle, the values written into the enable register 153 are the same as in the prior write but the five-bit value written into the count register 154 is changed to be the desired count value.

After the write, the enable bit in enable register 153 still contains a digital zero.

A digital high signal is therefore present on the active high load input lead LD of down counter 155 and a digital low signal is present on the active high count enable input lead EN of the down counter 155. Down counter 155 is therefore maintained in a permanent load condition such that down counter 155 repeatedly parallel loads the five-bit non-zero count value stored in count register 154.

When the domain circuitry within domain 101 is to be powered, then the processor performs a bus write cycle to write a digital high into the enable bit in enable register 153. This is performed by rewriting the same non-zero value into count register 154 as in the previous write cycle, but by changing the least significant bit of the word WR_DATA[0-31] to a digital high. Writing a digital one into the enable bit in enable register 153 causes a digital high signal to appear on the Q1 output lead of the enable register 153. OR gate 157 receives this digital high signal and causes the first enable signal EN1 to be asserted high. The assertion of the first enable signal EN1 at the first time T1 is illustrated in the waveform of FIG. 8. In the flowchart of FIG. 8A, method step 500 represents the using of the state machine to assert the first enable signal.

The digital high on the Q1 output lead of enable register 153 causes the digital high signal on the load input lead LD of down counter 155 to be removed and also causes a digital high signal to appear on the enable input lead EN of the down counter 155. The down counter 155 therefore starts to decrement the five-bit value output on its count output leads CNT. The initial count value at time T1 is the count value loaded into count register 154.

As illustrated in FIG. 6, the first enable signal EN1 is supplied by conductor 142 to centrally located SCSC 131. The propagating of the first enable signal EN1 through the centrally located SCSC 131 is also represented by method step 501 in the flowchart of FIG. 8A. The first enable signal EN1 causes the large N-channel pulldown transistor within SCSC 131 to be conductive. Current therefore starts to flow from local ground conductor 120, through SCSC 131, to global ground bus 108, and out of power domain 101. This current is represented in FIG. 6 by the arrow labeled IGND.

The waveform of FIG. 8 shows a rapid rise of this current IGND following the assertion of the first enable signal EN1. As the capacitance of local ground bus 120 is discharged to ground potential, the voltage on local ground bus 120 decreases as illustrated by the waveform labeled LGND in FIG. 8. The time constant of the LGND decrease may, for example, be 60 nanoseconds. The surge of the current IGND may be of sufficient magnitude that a voltage drop occurs across a portion of the global power supply bus 107. This is represented by the downward dimple 163 in the waveform labeled GPWR in FIG. 8. Similarly, the surge of current IGND may be of sufficient magnitude that a voltage drop occurs across a portion of the global ground bus 108. This is represented by the upward dimple 164 in the waveform labeled GGND in FIG. 8. Due to only a limited number (in this case one) of SCSCs being conductive, however, the peak magnitude of the current IGND is limited. The momentary drop in the relative difference between the voltage on the global supply bus 107 and the global ground bus 108 is therefore also limited. Limiting this momentary drop can help prevent a decrease in supply voltage that might otherwise adversely affect the operation of circuitry in neighboring power domains that are also coupled to the same global supply and ground buses. The SCSC that is made conductive by the first enable signal EN1 is centrally located within power domain 101 in order to minimize the voltage difference between any two points on the local ground bus 120 within domain 101 during the discharging of the capacitance of the local ground bus 120.

Next, an amount of time passes as down counter 155 decrements the count on its five-bit output CNT. After peaking, the magnitude of current IGND decreases as illustrated in FIG. 8. The voltage on local ground bus 120 continues to decrease as represented by the waveform labeled LGND in FIG. 8.

When the count value output by down counter 155 reaches zero, then five-input OR gate 156 detects this condition and outputs a digital zero signal. This digital zero signal disables the down counter 155 by forcing a digital low signal onto the enable input lead EN of the down counter. The digital zero signal output by OR gate 156 also causes a digital high signal to be asserted onto the lower input lead of AND gate 159. A digital high signal is already present on the upper input lead of AND gate 159 due to a digital high being stored in the enable bit of enable register 153. AND gate 159 therefore outputs a digital high signal which propagates through OR gate 158 and results in the asserting of the second enable signal EN2.

The rising edge of the second enable signal EN2 is illustrated in FIG. 8. The using of the state machine to assert the second enable signal is also represented by method step 502 in the flowchart of FIG. 8A. The magnitude of the current IGND at this time is just a small fraction of the peak current. Reference numeral 165 in FIG. 8 represents the amount of time between the assertion of the first enable signal EN1 and the assertion of the second enable signal EN2. This amount of time 165 is programmable by loading an appropriate value into count register 154 prior to the enabling of the control circuit 110 and prior to the down counting of down counter 155. Amount of time 165 is programmable in a range of from approximately zero to thirty-one clock periods of the clock signal CLK.

As illustrated in FIG. 6, the second enable signal EN2 is communicated by conductor 145 to the chain of SCSCs 132-139. Due to the non-inverting buffer in each SCSC of the chain, each SCSC introduces a propagation delay into the path of the second enable signal EN2. The large N-channel pulldown transistors of the SCSC 132-139 are therefore made to be conductive one at a time in sequential fashion as the second enable signal EN2 propagates down the chain. The SCSCs of the second set are said to be turned on in a daisy chain fashion. The propagating of the second enable signal through the chain of SCSCs 132-139 is also represented by method step 503 in the flowchart of FIG. 8A.

Figure 9:
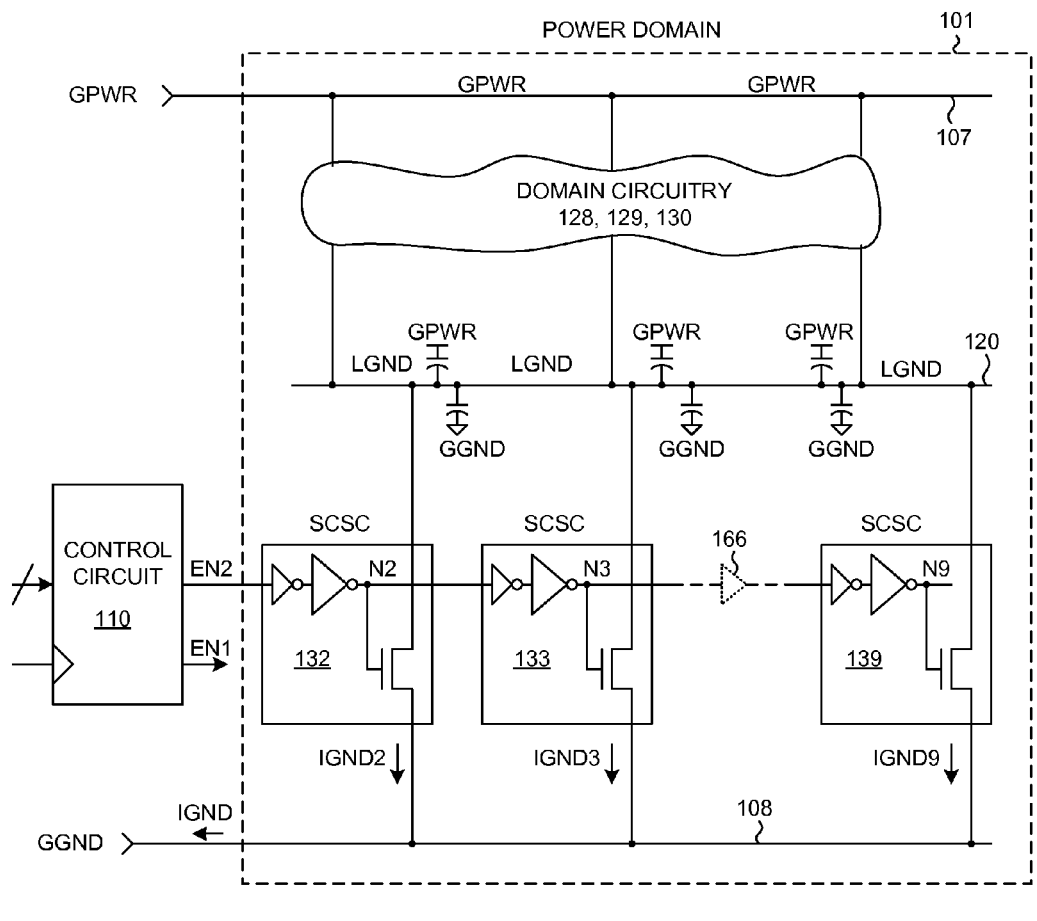
FIG. 9 is a schematic representation of the power management control circuit and the second chain of SCSCs in the first power domain. The diagram illustrates how an enable signal propagates down the second chain of SCSCs, from control node to control node, turning on the SCSCs one by one in a daisy chain fashion.

FIG. 9 is a schematic representation of control circuit 110 and the chain of the second set of SCSCs 132-139. The rising edge of the second enable signal EN2 propagates from node N2, to node N3, and down the chain to node N9 such that the discharge currents IGND2-IGND9 begin to flow approximately at the times T2-T9, respectively. The times T2-T9 are illustrated in FIG. 8. In the present embodiment, there is approximately a one nanosecond delay between each successive one of the times T2-T9. The discharge currents IGND2-IGND9 along with a discharge current IGND1 flowing through SCSC 131 together sum to make up the current denoted IGND in FIG. 8.

Figure 10:
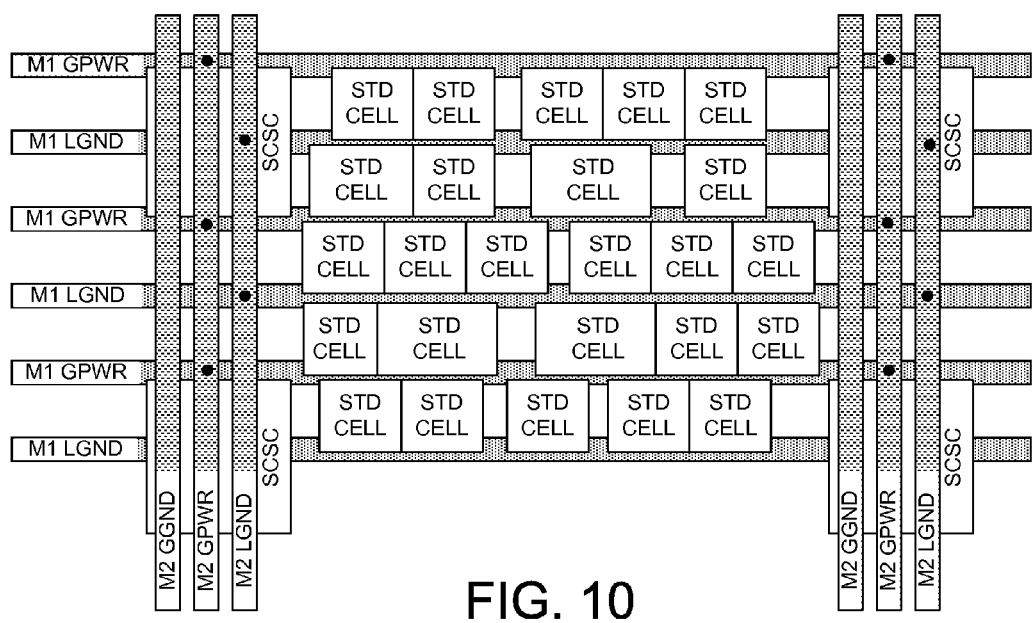
FIG. 10 is a simplified top-down layout diagram of a portion of the first power domain. The diagram is not a schematic, but rather shows the placement of standard cells relative to local and global supply buses.

FIG. 10 is a simplified top-down layout diagram of a portion of power domain 101. Domain circuitry 128-130 is realized using a library of standard cells. One standard cell in the library is the supply current switch circuit (SCSC) standard cell. Integrated circuit die 100 includes rows of power and ground metal conductors in a lower metal layer denoted M1. The conductors alternate in the order: global supply bus, local ground bus, global supply bus, local ground bus, from row to row down the integrated circuit as illustrated in FIG. 10. Most standard cells have a height that extends from one metal conductor row to an adjacent metal conductor row below it. Such standard cells are labeled STD CELL in FIG. 10. The logic circuitry of power domain 101 is realized using such standard cells. Unlike these standard cells, the SCSC standard cell is two rows high and extends from a global supply row conductor (denoted "M1 GPWR" in FIG. 10), across an area occupied by a local ground row conductor (denoted "M1 LGND" in FIG. 10), and to the next global supply row conductor below. The SCSC cell, unlike the other standard cells, is disposed at least partly underneath the vertical metal conductors of the next higher metal layer M2. In one embodiment, the SCSC standard cell is approximately 212 microns in width and approximately six microns in height. The conductors that supply the enable signal through the chain of SCSCs are routed at the same time that signal conductors that interconnect the other standard cells are routed. If desired, the signal path of the enable signal may extend through other logic as it extends from one SCSC to another SCSC. If additional propagation delay is desired at a location in a chain of SCSCs, or if the polarity of the enable signal is to be inverted, or if other gating of the enable signal is desired, then other desired logic can be inserted in the enable signal path between the control circuit 110 and the SCSCs of the chain of SCSCs, or between SCSC standard cells of the chain. Non-inverting buffer 166 of FIG. 9 represents a standard cell logic element that is added into a chain of SCSCs to introduce an additional propagation delay into the signal path of the second enable signal EN2.

Figure 11:
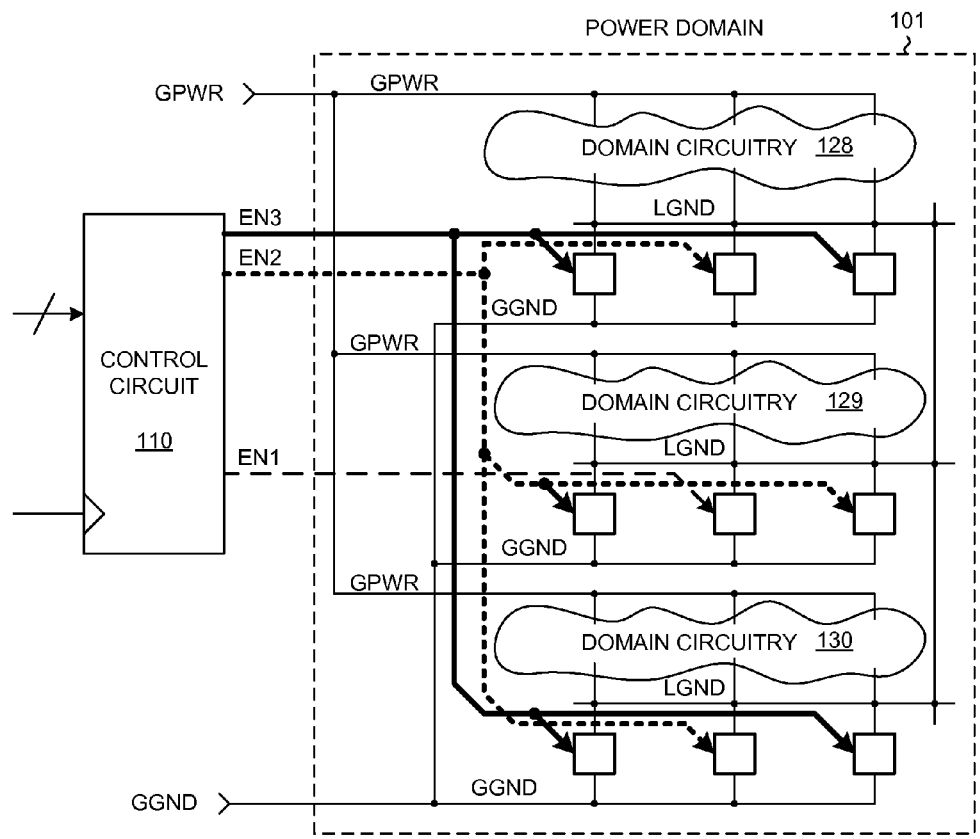
FIG. 11 illustrates an example wherein a power domain includes more than two sets of SCSCs.

Although only two sets of SCSCs are described above, a power domain can include three or more sets of SCSCs. FIG. 11 illustrates an example wherein power domain 101 includes three sets of SCSCs. A first set of SCSCs is controlled by a first enable signal EN1, a second set of SCSCs is controlled by a second enable signal EN2, and a third set of SCSCs is controlled by a third enable signal EN3. The amounts of time between the assertion of the first enable signal EN1 and the second enable signal EN2, and between the first enable signal EN1 and the third enable signal EN3 are programmable.

Figure 12:
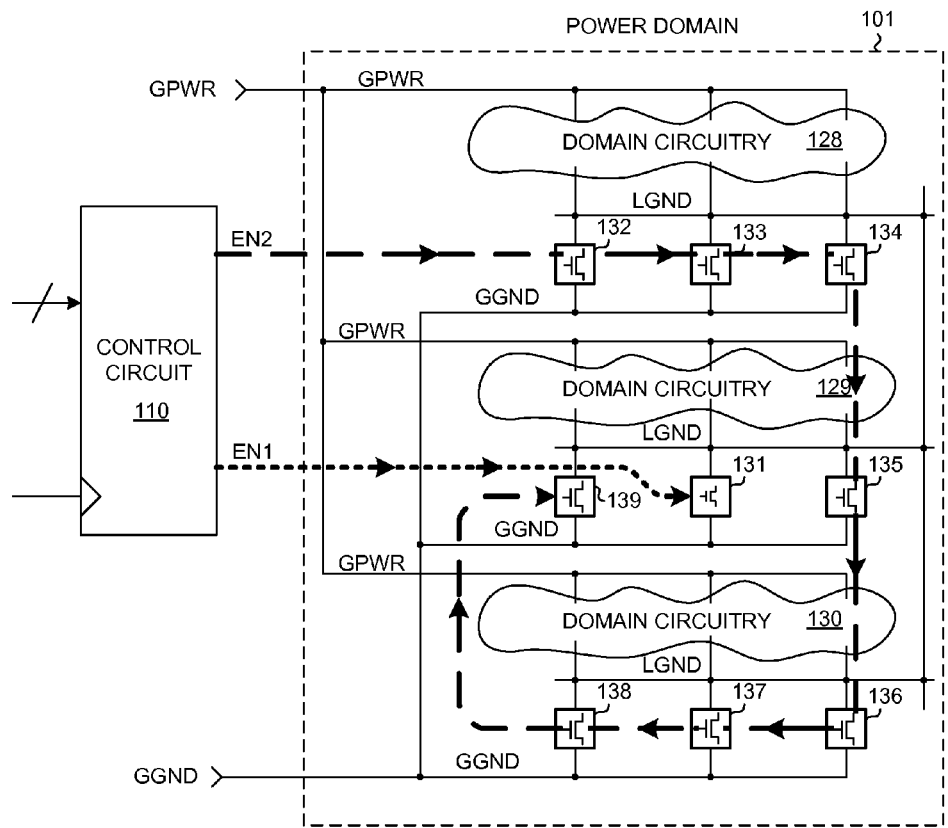
FIG. 12 illustrates an example wherein a power domain utilizes SCSCs having pulldown transistors of different sizes.

Although all the SCSCs in the examples described above have the same size N-channel pulldown transistors, SCSCs having N-channel pulldown transistors of different sizes can be employed in a single power domain. FIG. 12 illustrates an example wherein there are two SCSC standard cells in a toolbox of standard cells. One SCSC standard cell has a smaller N-channel pulldown transistor than the other SCSC standard cell. The maximum peak in current IGND can be reduced by using a SCSC standard cell having the smaller N-channel pulldown in place of a SCSC standard cell having a larger N-channel pulldown transistor. In the illustrated example, the standard cell having a smaller pulldown transistor is used for SCSC 131.

In another example, a single type of SCSC standard cell is employed that has both a large N-channel pulldown transistor coupled in parallel with a smaller N-channel pulldown transistor. An first enable signal is made to propagation from the gate of the smaller N-channel pulldown transistor of a first SCSC standard cell to the smaller N-channel pulldown transistor of a second SCSC standard cell, and so forth down a chain of the SCSC standard cells. A second enable signal is made of propagate from the gate of the larger N-channel pulldown transistor of the first SCSC standard cell to the gate of the larger N-channel pulldown transistor of the second SCSC standard cell, and so forth down the chain of the SCSC standard cells. The first enable signal is asserted first. The voltage on the local ground LGND is pulled down toward the ground potential on global ground GGND. When the voltage on LGND is adequately close to the voltage on global ground GGND, then the second enable signal is asserted, thereby enabling the larger N-channel pulldown transistors in daisy chain fashion.

Although circuitry can be fashioned wherein the times at which the various pulldown transistors are made conductive are determined entirely by hardware, it may be desired to be able to change the timing after integrated circuit die 100 has been designed. Susceptibility of circuitry within a power domain to supply voltage fluctuations may, for example, change over time throughout the design of an integrated circuit die. Operating conditions under which the integrated circuit die is to operate may be changed during the design of the integrated circuit and after fabrication of the integrated circuit. Similarly, operating requirements imposed on an integrated circuit design may evolve and change. It may be desired to use a single integrated circuit die design in two operating environments wherein one timing of the SCSCs may not be optimal or adequate for operation in both environments. The susceptibility of circuitry in one power domain to power supply fluctuations may not be known when a neighboring power domain is being designed. Similarly, the current consumption and operating characteristics of one power domain may not be known when sensitive circuitry in a neighboring power domain is being designed. For one or more of these reasons, flexibility in the control of the powering up a power domain may be desirable. Accordingly, in the embodiment of FIGS. 4-9, the time delay 165 between the assertion of the first enable signal EN1 and the assertion of the second enable signal EN2 is programmable. Time delay 165 can, for example, be changed as a result of execution of processor-executable instructions where the processor is a part of the integrated circuit die 100. The software programmable nature of time delay 165 allows flexibility in adapting the performance of the SCSC to different situations.

Figure 13:
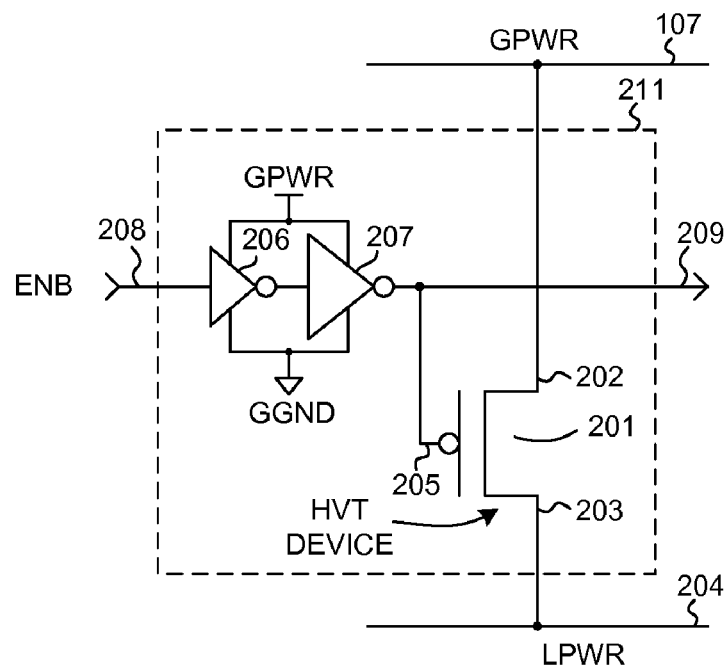
FIG. 13 is a simplified schematic diagram of an SCSC having a P-channel pullup transistor. The SCSC is used in the second power domain of the integrated circuit of FIG. 4.
Figure 14:
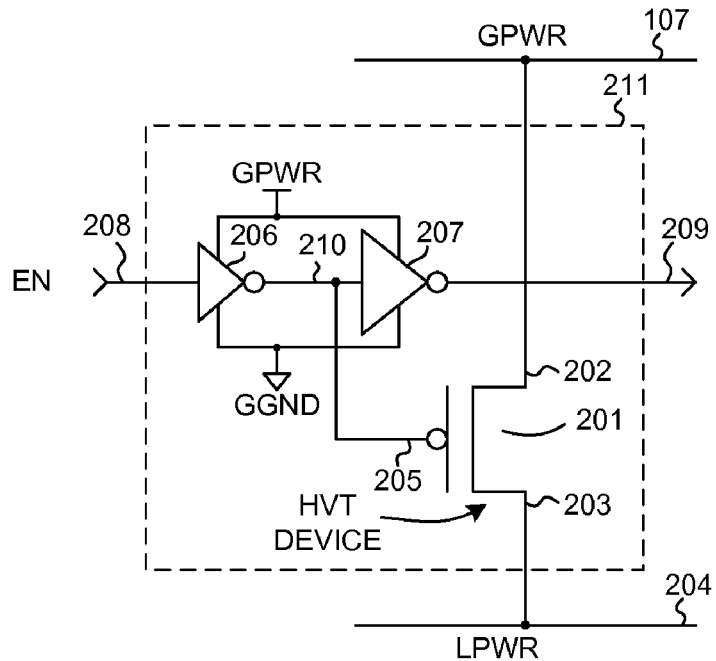
FIG. 14 is a simplified schematic diagram of an alternative structure of an SCSC having a P-channel pullup transistor.
Figure 15:
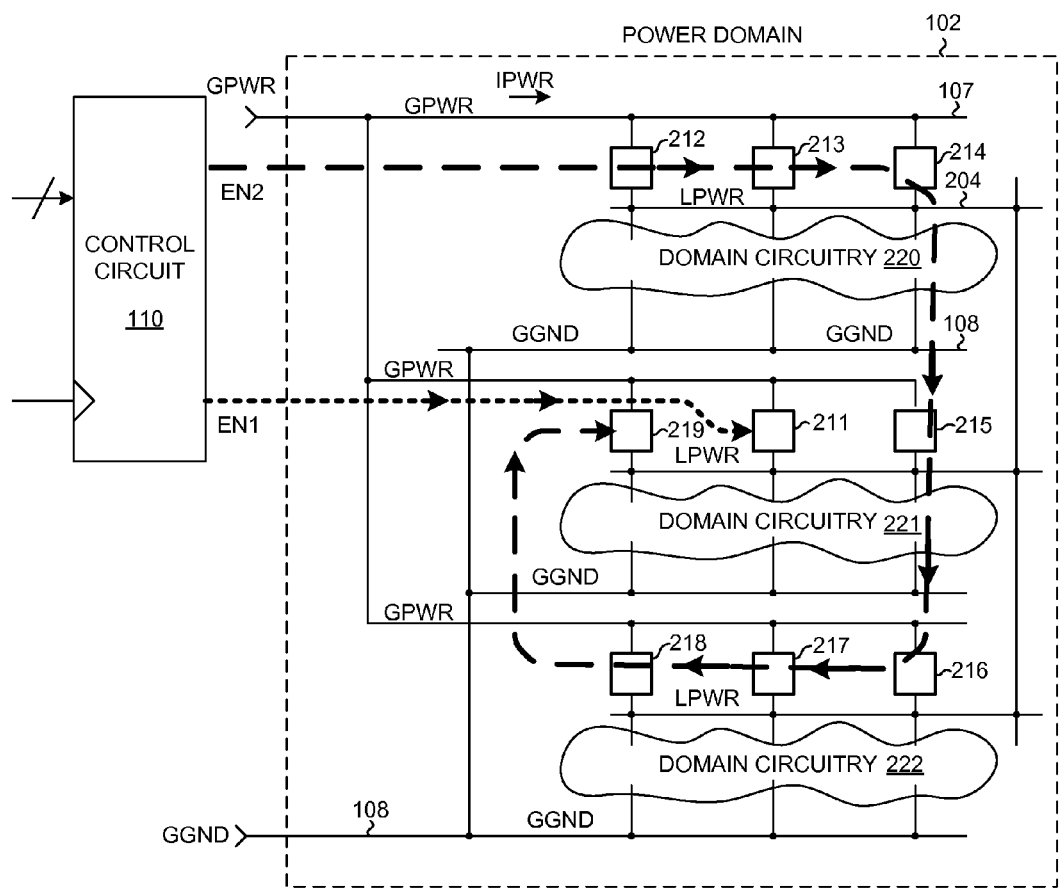
FIG. 15 is a diagram of the power management control circuit and second power domain of the integrated circuit of FIG. 4.

FIGS. 13-15 illustrate the structure and operation of the second power domain 102 of the integrated circuit die 100 of FIG. 4. The SCSCs of the second power domain 102, rather than involving N-channel pulldown transistors, involve P-channel pullup transistors. SCSC pulldown transistors are sometimes called "footswitches", whereas SCSC pullup transistors are sometimes called "head switches". Power domain 102 involves SCSCs having headswitches.

FIG. 13 is a schematic diagram of an SCSC 211 involving a large P-channel pullup transistor 201. The source terminal 202 of transistor 201 is coupled to global supply bus GPWR 107, the drain terminal 203 is coupled to a local power supply bus LPWR 204, and the gate terminal 205 is coupled to the output lead of a non-inverting buffer. The non-inverting buffer is made up of two series-connected inverters 206 and 207 as in the example of FIG. 5. The input lead of the buffer is the enable input lead 208 of SCSC 211. The output lead of the buffer is the enable output lead 209 of SCSC 211.

FIG. 14 is a schematic diagram of SCSC 211 that is identical to SCSC 211 of FIG. 13, except that the control terminal 205 of transistor 201 is coupled to an intermediate node 210 between the inverters 206 and 207 rather than to the output lead of the buffer.

FIG. 15 is a diagram of control circuit 110 and second power domain 102. There is logic within control circuit 110 for controlling the SCSCs of the second power domain 102 that is similar to the logic of FIG. 7 that controls the SCSCs of the first power domain 101. All SCSCs 211-219 are identical SCSCs involving P-channel pullup transistors as illustrated in FIG. 14. Were SCSCs of the type illustrated in FIG. 13 to be used, then the polarity of the enable signals EN1 and EN2 would be inverted. The polarity of the enable signals EN1 and EN2 can, for example, be inverted by adding inverters to the EN1 and EN2 outputs of the logic within control circuit 110, and/or by adding an inverting logic element outside control circuit 110 somewhere in the signal path of each of the enable signals EN1 and EN2 between control circuit 110 and the beginning of the two sets of SCSCs.

In operation, the first and second enable signals EN1 and EN2 are initially in the deasserted digital low state. The voltage on local supply bus 204 is typically at or near ground potential. The large P-channel pullup transistors within the SCSCs 211-219 are all nonconductive. Significant supply current cannot therefore flow from global voltage supply bus 107 to local voltage supply bus 204. Significant supply current cannot therefore flow through the domain circuitry 220-222 of second power domain 102. The domain circuitry of the second power domain 102 is therefore unpowered.

Next, the enable and count registers within control circuitry 110 that control SCSCs 211-219 are loaded such that an initial count value is written into the count register. The enable bit in the enable register is then loaded with a digital high such that the first enable signal EN1 is asserted to a digital high at a first time. This causes the large P-channel pullup transistor within the SCSC 211 of FIG. 14 to be made conductive. The capacitance of local supply bus LPWR 204 begins to be charged through SCSC 211. As the capacitance is charged, the voltage on local supply bus 204 increases. The magnitude of the peak current IPWR flowing from global supply bus GPWR 107 to the local supply bus LPWR 204 is limited by the on resistance of the P-channel pullup transistor of SCSC 211. As in the example of FIG. 6, the SCSC that is enabled first is disposed in a central region within the power domain being powered. The down counter within control circuitry 110 then begins counting down from the initial count value. After peaking, the current IPWR declines. When the down counter reaches a count value of zero, then control circuitry 110 asserts the second enable signal EN2. Second enable signal EN2 propagates in daisy chain fashion through the chain of the second set of SCSCs 212-219. Due to the propagation delays through the inverters in the SCSCs of the second chain, the large P-channel transistors within successive SCSCs in the chain begin to conduct at times that are staggered from one another by approximately one nanosecond. The time delay between the assertion of the first enable signal EN1 and the assertion of the second enable signal EN2 is software programmable as in the example of FIG. 6 described above. The same processor that can write to the enable and count registers that control the SCSCs of the first power domain can also write to the enable and count registers that control the SCSCs of the second power domain.

Figure 16:
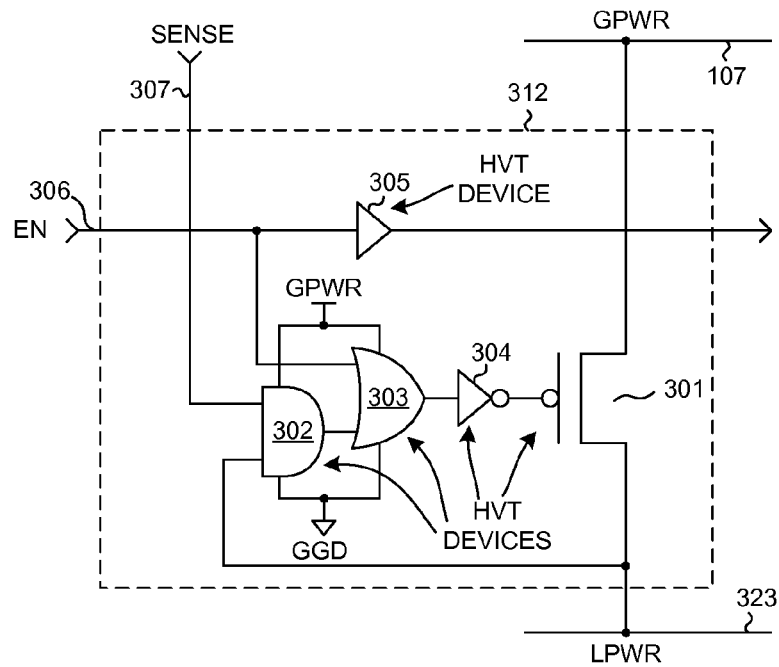
FIG. 16 is a simplified schematic diagram of an SCSC used in the third power domain of the integrated circuit of FIG. 4. The SCSC has both a SENSE input lead and an ENABLE input lead.
Figure 17:
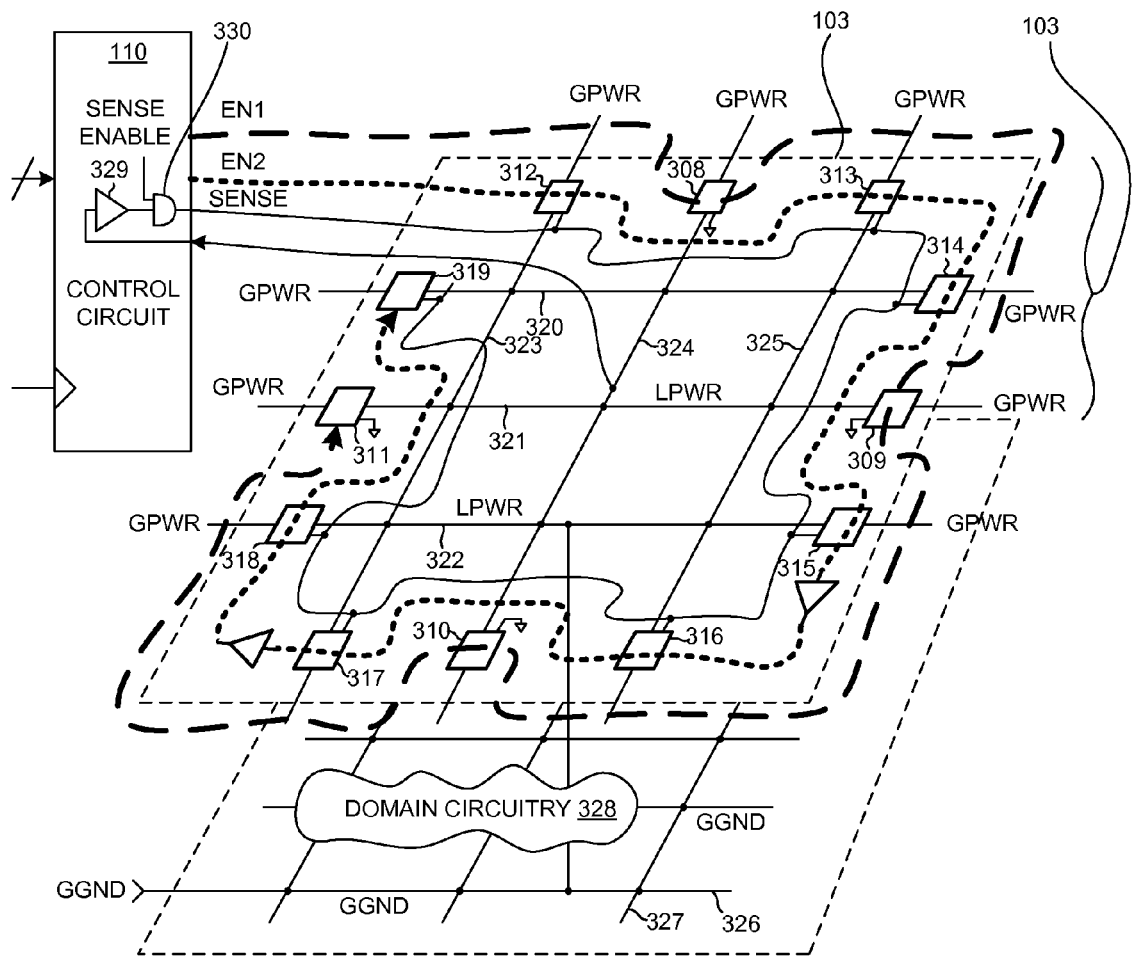
FIG. 17 is a simplified perspective view of the power management control circuit and the third power domain of the integrated circuit of FIG. 4. The third power domain utilizes SCSCs of the type illustrated in FIG. 16.

FIGS. 16 and 17 illustrate the structure and operation of the third power domain 103 of the integrated circuit die 100 of FIG. 4. FIG. 16 illustrates the structure of the SCSC 312 used. SCSC 312 includes a large P-channel pullup FET 301, an AND gate 302, an OR gate 303, an inverter 304, and a non-inverting delay element 305. A tool box of standard cells can, for example, include a standard cell for SCSC 308. The SCSC standard cell is placed under the vertical M2 columns of power and ground conductors at locations where the vertical power and ground conductors cross over horizontally extending power and ground conductor as illustrated in FIG. 10.

Signals are routed to the SCSC standard cells by the same process that signal lines are routed to other standard cells in the integrated circuit.

The SCSC 312 of FIG. 16 can be used in one of two modes. In a first mode, the enable input lead 306 to the SCSC is held at a digital logic low potential. The second bit in the enable register of the control circuit for the third power domain is a SENSE enable bit. This second SENSE enable bit is set to be a digital high so that a SENSE ENABLE signal (see FIG. 17) will be asserted, and so that the SENSE signal output from control circuit 110 can be asserted high by voltage sensing element 329 and AND gate 330 under certain circumstances. If the SENSE signal received onto a sense input lead 307 of the SCSC 312 of FIG. 16 is high, and if AND gate 302 of the SCSC senses the voltage on an inner local supply conductor LPWR 323 to be a digital logic high, then the P-channel transistor 301 of the SCSC is turned on.

In a second mode, the P-channel transistor 301 of SCSC 312 is not made conductive due to local sensing of the voltage of the inner supply grid LPWR. Rather, the SENSE enable bit in the enable register of the control circuit 110 is cleared to be a digital low so that the SENSE signal that is output by control circuit 110 to the second set of SCSCs is always a digital low. Rather than the SCSC controlling whether the P-channel transistor 301 is conductive based on a locally sensed voltage, it is an enable signal received onto the enable input lead 306 of the SCSC 312 that controls whether the P-channel transistor will be conductive or nonconductive.

FIG. 17 is a simplified perspective view of third power domain 103. A ring of identical SCSCs 308-319 isolates an inner grid of local power supply conductors LPWR 320-325 from the outwardly extending global power supply conductors (labeled GPWR) of the global power grid. When the large P-channel transistors of SCSCs 308-319 are non-conductive, the inner grid of local power supply conductors LPWR 320-325 is isolated from the surrounding global supply grid. The voltage on the inner grid of local supply conductors typically floats to a voltage near ground potential. When the large P-channel transistors of SCSCs 308-319 are conductive, on the other hand, then the inner grid of local power supply conductors LPWR is strongly coupled to the surrounding global power supply grid GPWR and is maintained at the supply voltage for the integrated circuit. The supply voltage may, for example, be 1.3 volts.

As illustrated in FIG. 17, third power domain 103 further includes a grid of global ground conductors 326 and 327. Domain circuitry 328 that is to be powered draws a supply current from the inner grid of local supply conductors 320-325. Domain circuitry 328 is directly grounded to and connected to the grid of the global ground conductors 327-326.

Control circuit 110 in FIG. 17 includes control circuitry for controlling the SCSCs 308-319 of the third power domain 103. The control circuitry for controlling the SCSCs 308-319 is similar to the control circuitry of FIG. 7 except that that it includes voltage sensing element 329 and AND gate 330. Voltage sensing element 329 may, for example, be a noninverting digital logic buffer having a hysteresis switching characteristic. The output of the SENSE enable bit of the enable register is the SENSE ENABLE signal. This SENSE ENABLE signal is supplied to an input lead of AND gate 330. Accordingly, if the SENSE enable bit in the enable register is cleared to contain a digital zero, then the SENSE signal supplied to the second set of SCSCs in FIG. 17 by AND gate 330 is prevented from being asserted to a digital logic high. If the SENSE enable bit is set to be a digital one, then the SENSE signal is high or low depending on a voltage sensed by voltage sensing element 329.

In operation, the count register of the control circuitry that controls SCSCs 308-319 is loaded such that the largest possible count value is written into the count register. In the illustrated example, the five-bit value 11111 is written into the count register for the third power domain. The enable bit for the third power domain, and the SENSE enable bit for the third power domain are set, thereby causing the first enable signal EN1 to be asserted and causing the down counter to start counting. The first enable signal EN1 enables a first set of SCSCs 308-311 in daisy chain fashion. As the capacitance of the inner grid is charged due to current flow through the enabled SCSCs 308-311, the voltage on the inner grid LPWR increases in a controlled fashion from an initial low voltage (for example, ground potential) up toward the supply voltage (for example, 1.3 volts) on the surrounding supply grid GPWR.

The count value written into the down counter is large, so the count value output by the counter has not yet reached zero and the second enable signal EN2 remains low. The SCSCs 312-319 of the second set of SCSCs are not, therefore, enabled due to the second enable signal EN2 being asserted. The voltage on the inner power grid continues to increase but is still below a low-to-high switching voltage sensed by voltage sensing element 329. Voltage sensing element 329 therefore continues to output a digital logic low signal and the signal SENSE output by control circuit 110 remains a digital logic low.

When the voltage on the inner power grid conductors 320-325 increases past the low-to-high switching voltage of voltage sensing element 329, then voltage sensing element 329 outputs a digital high signal. Because the SENSE enable bit in the enable register of the control circuit 110 was initialized to be a digital high, the digital high output by voltage sensing element 329 passes through AND gate 330 and the SENSE signal output by control circuit 110 is asserted high.

As seen from the structure of the SCSC of FIG. 16, AND gate 302 will not output a digital high logic signal unless both the SENSE signal is high and the voltage on the inner power grid LPWR is a digital logic high as sensed on the lower input lead of AND gate 302. In the example of FIG. 17, the low-to-high switching voltage sensed by voltage sensing element 329 is a lower voltage than the digital logic high. A period of time therefore exists during which the signal SENSE is asserted, but the voltage on the inner grid is not yet high enough to be sensed by the AND gates 302 (see FIG. 16) of the SCSCs 312-319 as a digital logic high. The pullup transistors of the second set of SCSCs 312-319 are therefore nonconductive. As the voltage on the inner grid continues to increase, each SCSC of the second set of SCSCs 312-319 senses the voltage locally on the inner power grid. If the voltage of the inner grid as sensed locally by an SCSC reaches a digital logic high level, then the AND gate 302 within the local SCSC that sensed the digital logic high outputs a digital high, thereby causing OR gate 303 within the SCSC to output a digital logic high, causing inverter 304 to output a digital logic low, and controlling the pullup transistor 301 of the SCSC to be conductive. One by one the pullup transistors within the SCSCs of the second set of SCSCs 312-319 are made conductive until the pullup transistors of all the SCSCs 312-319 are conductive. Operation of the AND gate 302 of the SCSC of the second set of SCSCs ensures that the pullup transistor of the local SCSC is not made conductive if the voltage on the inner power grid is still at a digital logic low level. Keeping these pullup transistors off when the voltage difference between the global supply grid and the local supply gird is great helps prevent what would otherwise be a large peak discharge current from flowing through the global supply bus GPWR and into the third power domain and/or from flowing from the third power domain and into the global ground bus GGND. By reducing the magnitude of this discharge current, unwanted power voltage supply fluctuations due to large surge currents that might otherwise adversely affect the operation of circuitry in neighboring power domains can be avoided.

Figure 18:
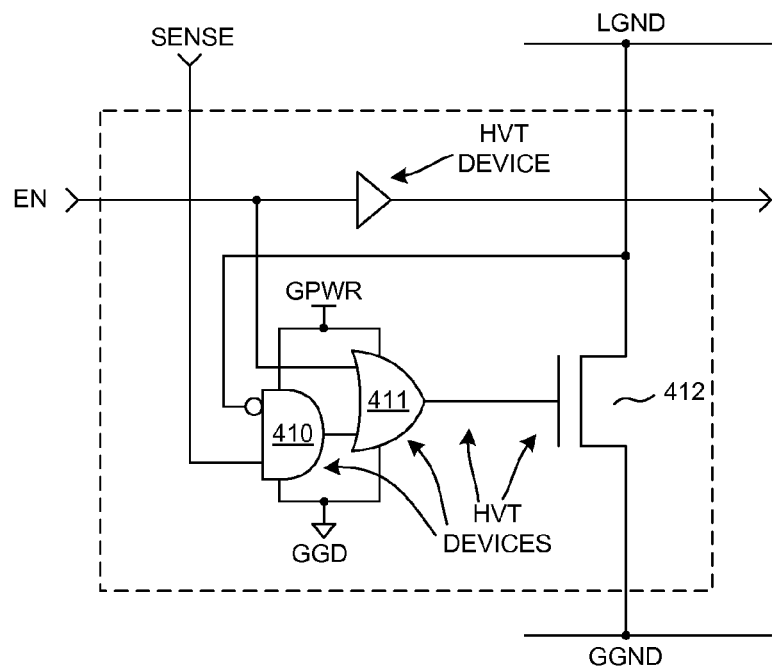
FIG. 18 is a simplified schematic diagram of an SCSC used in the fourth power domain of the integrated circuit of FIG. 4.
Figure 19:
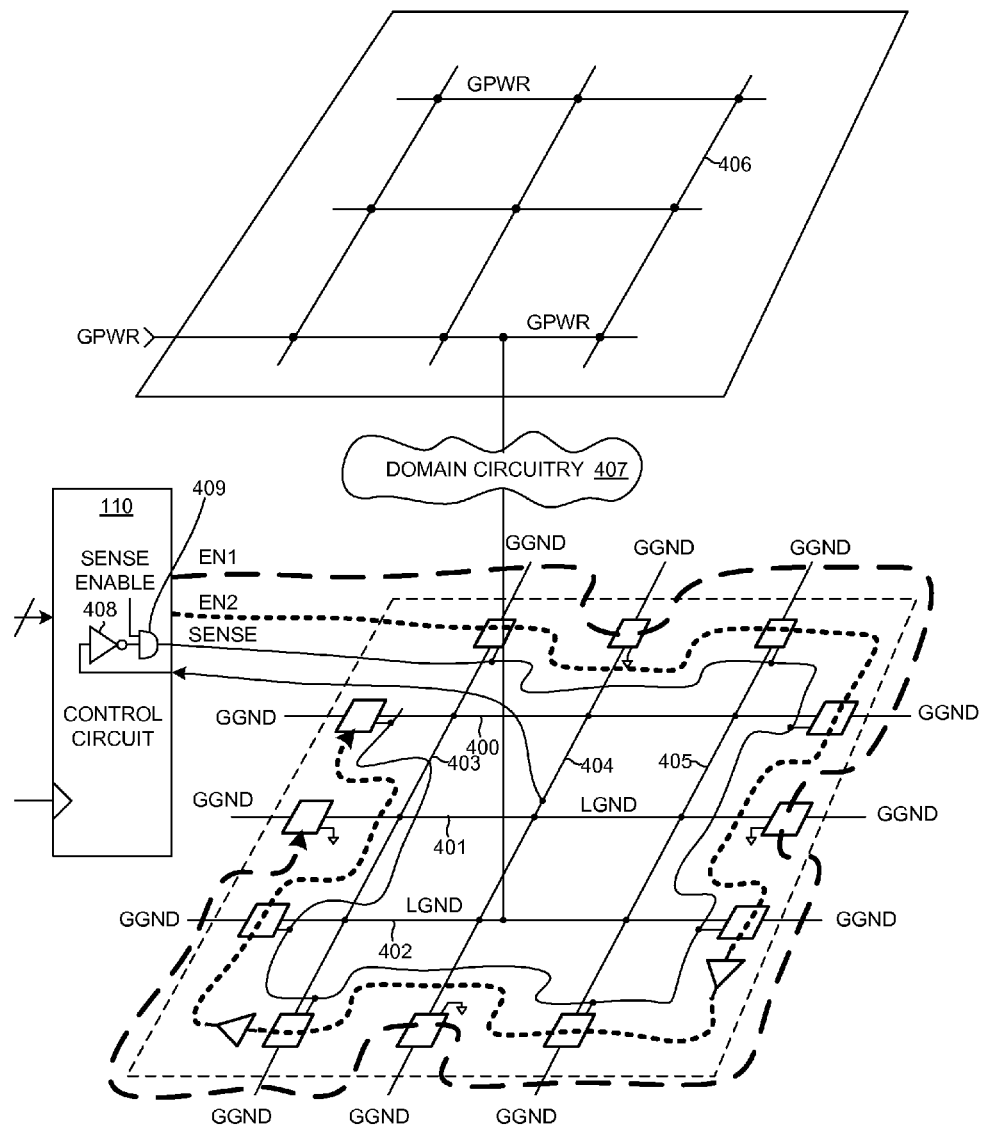
FIG. 19 is a simplified perspective view of the power management control circuit and the fourth power domain of the integrated circuit of FIG. 4. The fourth power domain utilizes SCSCs of the type illustrated in FIG. 18.

FIGS. 18 and 19 illustrate the structure and operation of the fourth power domain 104 of the integrated circuit die 100 of FIG. 4. The circuitry of FIGS. 18 and 19 is similar to the circuitry of FIGS. 16 and 17, except that the inner grid is an inner ground grid rather than an inner voltage supply grid. Rather than the large FETs of the ring of SCSCs being P-channel pullup FETs as in the case of the SCSC of FIG. 16, the large FETs of the ring of SCSCs are N-channel pulldown FETs.

The power supply leads of the domain circuitry 407 are directly coupled to the global supply grid 406. The ground leads of the domain circuitry 407 are directly coupled to an inner ground grid of conductors 400-405. The control circuitry within control circuit 110 that controls the fourth power domain 104 is substantially identical to the control circuitry that controls the third power domain 103 except that the control circuitry for the fourth power domain 104 includes an inverting voltage sensing element 408 rather than a noninverting voltage sensing element.

In operation, the inner ground grid LGND of conductors 400-405 is initially isolated from a surrounding global ground grid GGND of conductors. First and second enable signals EN1 and EN2 are not asserted. The voltage on the inner ground grid is typically at or near the supply voltage present on a global voltage supply grid GPWR 406. The voltage on the input lead of voltage sensing element 408 is higher than a high-to-low switching voltage. Voltage sensing element 408 therefore is outputting a digital logic low. The pulldown FETs of all the SCSCs of the illustrated ring of SCSCs are off.

The enable and count registers of the control circuitry are loaded as described above in connection with FIGS. 16 and 17 such that the enable bit is set, the SENSE enable bit is set, and such that a large count value is loaded into the count register. As a result, the first enable signal EN1 is asserted, thereby enabling a first set of the SCSCs in a daisy chain fashion. The voltage on the inner ground grid decreases until it falls below the high-to-low switching voltage of voltage sensing element 408. Because the SENSE ENABLE signal is set to be a digital logic high, the AND gate 409 on the output of the voltage sensing element 408 does not prevent the asserting of the SENSE signal. The SENSE signal is therefore asserted high and each SCSC of the second set of SCSCs receives the SENSE signal. Each SCSC of the second set of SCSC therefore senses the magnitude of the voltage on the inner ground grid 400-405 at a location close to the SCSC. If the local voltage on the inverting input lead of AND gate 410 is sensed to be a digital logic low, then AND gate 410 outputs a digital logic high signal. This digital logic high signal passes through OR gate 411 to the gate of the pulldown FET 412 of the sensing SCSC. In this fashion, the pulldown FETs of the second set of SCSCs are turned on one by one as the locally sensed voltages on the inner ground grid 400-405 are sensed to be adequately low. Keeping the pulldown transistors of the second set of SCSCs off until the locally sensed voltage on the inner grid is at a digital logic low level prevents what might otherwise be a large peak discharge current from flowing through the global supply bus GPWR and into the fourth power domain and/or from flowing from the fourth power domain and into the global ground bus GGND. By reducing the peak magnitude of this discharge current, unwanted power voltage supply fluctuations due to large surge currents that might otherwise adversely affect the operation of circuitry in neighboring power domains can be avoided.

To use the SCSCs of the second set of SCSC in the second mode, the SENSE enable bit for the fourth power domain is initialized to be a digital zero. Due to AND gate 409, the SENSE enable bit being cleared prevents control circuit 100 from asserting the SENSE signal to a digital high. Accordingly, the only way that the large FET of an SCSC of the second set of SCSCs can be made conductive is due to the second enable signal EN2 being asserted high. The count value loaded into the count register of the control circuitry for the power domain determines the time delay between the assertion of the first enable signal EN1 and the assertion of the second enable signal EN2, and therefore determines when the second enable signal EN2 will propagate through the chain of the second set of SCSCs.

A selected one of the power domains 101-104 of the integrated circuit die 100 of FIG. 4 can also be powered down using the novel control circuit 110 and SCSC structure. To power down a power domain, the contents of any registers in the power domain are read out of the power domain and are stored in a memory that will remain powered. The enable bit of the enable register 153 for the desired power domain is then cleared. The clearing of the enable bit causes the first and second enable signals EN1 and EN2 to transition to digital low values. Where a chain of SCSCs is coupled to an enable output lead of the control circuit, the high-to-low transition of the enable signal propagates down through the chain of SCSCs, turning the transistors in the SCSCs off one by one in staggered, daisy chain fashion. The staggered daisy chain turn off of the SCSCs prevents a rapid decrease in supply current that might otherwise due to inductive characteristics of the power and ground grids cause unwanted ground bounce or supply voltage fluctuations.

Although a control circuit is set forth above that includes a down counter that asserts an enable signal when the down counter reaches a zero count, other ways of setting an amount of time between the time a first enable signal is asserted and the time a second enable signal is asserted. A plurality of values may, for example, be written into the control circuit in one or more write cycles. When a counter in the control circuit reaches a count equal to a first of the values, then the first enable signal is asserted. When the counter reaches a count equal to the second of the values, then the second enable signal is asserted. In another embodiment, the control circuit includes a single register, where the contents of the various bits of the register are the various enable signals. The register is powered up such that the contents of the register place the enable signals in appropriate states. A time delay between the assertion of one enable signal and another enable signal is determined by the time delay between processor writes to the register, where the first processor write asserts a first enable signal and a second processor write asserts a second enable signal. In yet another embodiment, the control circuit is a dedicated state machine wherein transitioning to a state causes assertion of a corresponding enable signal, and wherein the transitioning between states takes into account input signal conditions. Such input signal conditions can include, for example, whether a voltage on a local supply conductor is above or below a predetermined threshold voltage.

In another embodiment, the first SCSC of a chain of SCSCs is a modified version of the SCSC of FIG. 18 in that the node at the gate of the large pulldown transistor is coupled out of the SCSC onto an output terminal so that the voltage on the gate of the transistor is available on the output terminal of the SCSC. This output terminal of the first SCSC is coupled to the enable input terminal of the second SCSC of the chain. The second and subsequent SCSCs of the chain are of the type illustrated in FIG. 5. In operation, the first SCSC asserts an enable signal onto the enable input terminal of the second SCSC of the chain only after the first SCSC has sensed that the voltage on the local ground grid is low enough to be a digital logic level low. Once the first SCSC asserts the enable signal, then the enable signal propagates down the chain of SCSCs from the second SCSC on down the chain, turning on the SCSCs in daisy chain fashion. The enable output terminal of the last SCSC of the chain is coupled back to a bit in a register in the control circuit. When the enable signal is asserted on the enable output terminal of the last SCSC of the chain, then the bit in the register is set. This register and bit can be read in a read bus cycle by the same processor that controls the control circuit. The bit serves as a flag that indicates that the power up sequence has been completed.

Although certain specific embodiments are described above for instructional purposes, the present invention is not limited thereto. Due to the ability to alter the time delay between the turn on a first set of SCSCs and a second set of SCSCs, and due to the ability to control multiple of sets of SCSCs, local ground bounce and supply voltage problems can be solved empirically by changing the operation of the SCSCs to eliminate the problem without fully understanding the causes and characteristics of the problem. This flexibility allows SCSCs to be distributed uniformly across an integrated circuit die being designed at a time in the design cycle when all the details of circuitry with the various power domains are not yet known. The flexible distributed SCSC design allows a circuit designer to tailor operation of the SCSC structure to accommodate future power domain supply current switching needs and affords the circuit designer a degree of confidence that future supply current switching needs can be met without redoing the floorplan and SCSC power distribution structure of the integrated circuit design. The software programmable nature of the SCSC structure also allows operation of the SCSC structure to be changed. The control circuit and SCSC structure can in real time change the manner in which they power up and/or power down power domains during operation of an integrated circuit. The voltage on gate of the large FET transistor of an SCSC can be overdriven to minimize the source to drain voltage drop across the switch when the FET is conductive and the SCSC is coupling the local supply conductor to the global supply conductor. The switch within an SCSC can be an suitable type of switch such as, for example, a high threshold voltage FET, an ordinary logic FET, a bipolar transistor or a DMOS power transistor. The switch can involve multiple such transistors. Rather than coupling a local grid to a global grid, an SCSC can be used to couple one plate of a bypass capacitor to a grid such that before the transistor in the SCSC is turned on the bypass capacitor is discharged, and after the SCSC is turned on one plate of the bypass transistor is coupled to one grid, the other plate of the bypass capacitor is coupled to the other grid, and the bypass capacitor is charged and functioning as a bypass capacitor. Accordingly, various modifications, adaptations, and combinations of the various features of the described specific embodiments can be practiced without departing from the scope of the invention as set forth in the claims.

What is claimed is:

1. An apparatus comprising:
   means for using a state machine to assert a first enable signal, wherein the state machine, a first supply current switch circuit (SCSC) and a chain of SCSCs are parts of a single integrated circuit;
   means for propagating the first enable signal through the first SCSC, wherein the first SCSC includes a switch having a control terminal, and wherein when the first enable signal is on the control terminal, the switch couples a local supply bus to a global supply bus through the first SCSC;
   means for using the state machine to assert a second enable signal, wherein the second enable signal is asserted a programmable number of clock cycles after a first clock cycle is asserted; and
   means for propagating the second enable signal through the chain of SCSCs, wherein each SCSC in the chain includes a switch having a control terminal, wherein when the second enable signal is present on the control terminal of a switch in an SCSC in the chain, then the switch couples the local supply bus to the global supply bus through the SCSC, and wherein the second enable signal is made to propagate through the control terminal of the switch of each SCSC in the chain.

2. The apparatus of claim 1, wherein the global supply bus is a global ground bus and wherein the local supply bus is a local ground bus.

3. The apparatus of claim 1, wherein the global supply bus is a global supply voltage bus and wherein the local supply bus is a local supply voltage bus.

4. The apparatus of claim 1, further comprising:
   a control circuit that generates the first enable signal and the second enable signal, wherein the enable signals are digital logic signals.

* * * * *